US011818726B2

(12) United States Patent
Tiirola et al.

(10) Patent No.: US 11,818,726 B2
(45) Date of Patent: Nov. 14, 2023

(54) DOWNLINK CONTROL OF UNLICENSED SUB-BANDS

(71) Applicant: Nokia Technologies Oy, Espoo (FI)

(72) Inventors: Esa Tiirola, Kempele (FI); Karol Schober, Helsinki (FI); Jari Mustajärvi, Espoo (FI); Tao Tao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 497 days.

(21) Appl. No.: 17/277,861

(22) PCT Filed: Sep. 27, 2018

(86) PCT No.: PCT/CN2018/108063
§ 371 (c)(1),
(2) Date: Mar. 19, 2021

(87) PCT Pub. No.: WO2020/061937
PCT Pub. Date: Apr. 2, 2020

(65) Prior Publication Data
US 2021/0352633 A1  Nov. 11, 2021

(51) Int. Cl.
*H04W 72/23* (2023.01)
*H04W 16/14* (2009.01)
*H04W 72/0453* (2023.01)

(52) U.S. Cl.
CPC ........... *H04W 72/23* (2023.01); *H04W 16/14* (2013.01); *H04W 72/0453* (2013.01)

(58) Field of Classification Search
CPC . H04W 72/23; H04W 16/14; H04W 72/0453; H04W 72/20; H04W 16/00;
(Continued)

(56) References Cited

U.S. PATENT DOCUMENTS

| 2017/0201308 | A1* | 7/2017 | Park | H04W 16/14 |
| 2018/0132243 | A1* | 5/2018 | Yang | H04W 16/10 |
| 2019/0342870 | A1* | 11/2019 | Shen | H04W 72/23 |

FOREIGN PATENT DOCUMENTS

| CN | 102316535 A | 1/2012 |
| CN | 104285490 A | 1/2015 |

(Continued)

OTHER PUBLICATIONS

Office action received for corresponding Vietnam Patent Application No. 1-2021-02219, dated May 19, 2021, 1 page of office action and 1 page of Translation available.

(Continued)

*Primary Examiner* — Kiet Tang
(74) *Attorney, Agent, or Firm* — Nokia Technologies Oy

(57) ABSTRACT

Embodiments of the present disclosure relate to methods, devices and computer readable mediums for downlink control of unlicensed sub-bands. The method comprises determining a search space configuration associated with control resources on a plurality of sub-bands which are unlicensed, the search space configuration indicating candidates for detection of downlink control information for the plurality of sub-bands; determining, from the search space configuration, positions of the candidates on the control resources within each of the plurality of sub-bands; mapping an available number of candidates to the determined positions based on a transmission bandwidth assumed by a terminal device; and transmitting downlink control information to the terminal device on the mapped candidates.

20 Claims, 5 Drawing Sheets

(58) Field of Classification Search
CPC ... H04W 72/044; H04L 5/0053; H04L 5/0094
See application file for complete search history.

(56) References Cited

FOREIGN PATENT DOCUMENTS

| | | |
|---|---|---|
| CN | 106714322 A | 5/2017 |
| CN | 107302797 A | 10/2017 |
| CN | 107306147 A | 10/2017 |
| EP | 3291475 A1 | 3/2018 |
| EP | 3337247 A1 | 6/2018 |
| JP | 2018-523445 A | 8/2018 |
| WO | 2017/041601 A1 | 3/2017 |
| WO | 2017/171422 A1 | 10/2017 |
| WO | 2018/031327 A1 | 2/2018 |
| WO | 2019/193238 A1 | 10/2019 |

OTHER PUBLICATIONS

Office action received for corresponding Japanese Patent Application No. 2021-517570, dated Apr. 13, 2023, 1 page of office action and no page of Translation available.

Extended European Search Report received for corresponding European Patent Application No. 18934962.4, dated Apr. 25, 2022, 6 pages.

"Remaining Issues on Search Spaces", 3GPP TSG RAN WG1 Meeting#92, R1-1802903, Agenda: 7.1.3.1.2, Ericsson, Feb. 26-Mar. 2, 2018, 16 pages.

"Revised SID on NR-based Access to Unlicensed Spectrum", 3GPP TSG RAN Meeting #80, RP-181339, Agenda : 9.4.3, Qualcomm Incorporated, Jun. 11-14, 2018, 5 pages.

"3rd Generation Partnership Project; Technical Specification Group Radio Access Network;NR; NR and NG-RAN Overall Description; Stage 2(Release 15)", 3GPP TS 38.300, V15.2.0, Jun. 2018, pp. 1-87.

"3rd Generation Partnership Project; Technical Specification Group Radio Access Network; NR;Radio Resource Control (RRC) protocol specification(Release 15)", 3GPP TS 38.331, V15.2.1, Jun. 2018, pp. 1-303.

"3rd Generation Partnership Project; Technical Specification Group Radio Access Network; NR;Physical layer procedures for control (Release 15)", 3GPP TS 38.213, V15.2.0, Jun. 2018, pp. 1-99.

International Search Report and Written Opinion received for corresponding Patent Cooperation Treaty Application No. PCT/CN2018/108063, dated May 30, 2019, 9 pages.

Office Action received for corresponding Indian Patent Application No. 202147017581, dated Feb. 23, 2022, 6 pages.

Office action received for corresponding Japanese Patent Application No. 2021-517570, dated Jul. 19, 2022, 3 pages of office action and 4 pages of Translation available.

"Frame structure for NR-U", 3GPP TSG-RAN WG1 Meeting #94, R1-1809201, Agenda: 7.2.2.2, Ericsson, Aug. 20-24, 2018, pp. 1-7.

* cited by examiner

300 ↙

|  | SUBBANDS | | | |
|---|---|---|---|---|
|  | a | b | c | d |
| 1 SUB-BAND | x | | | |
|  | | x | | |
|  | | | x | |
|  | | | | x |
| 2 SUB-BANDS | x | x | | |
|  | | x | x | |
|  | | | x | x |
| 3 SUB-BANDS | x | x | x | |
|  | | x | x | x |
| 4 SUB-BANDS | x | x | x | x |

FIG. 3

DOWNLINK CONTROL OF UNLICENSED SUB-BANDS

RELATED APPLICATION

This application claims priority to PCT Application No. PCT/CN2018/108063, filed on Sep. 27, 2018, which is incorporated herein by reference in its entirety.

TECHNICAL FIELD

Embodiments of the present disclosure generally relate to the field of telecommunication, and in particular, to methods, devices and computer readable storage media for downlink control of unlicensed sub-bands.

BACKGROUND

The new radio access system, which is also called NR system or NR network, is the next generation communication system. The 3rd Generation Partnership Project (3GPP) has initiated NR unlicensed (NR-U) Study Item (SI). Currently, the only agreement related to downlink (DL) control is very broad. For example, it is agreed to study the design changes needed to support the following channels/signals in NR-U: Physical Downlink Control Channel (PDCCH)/Physical Downlink Shared Channel (PDSCH), Physical Uplink Control Channel (PUCCH)/Physical Uplink Shared Channel (PUSCH), Primary Synchronization Signal (PSS)/Secondary Synchronization Signal (SSS)/Physical Broadcast Channel (PBCH), Physical Random Access Channel (PRACH), DL and uplink (UL) reference signals applicable to the operational frequency range.

In NR, the introduction of the new bandwidth part (BWP) concept allows to flexibly and dynamically configure User Equipment's (UE's) operating bandwidth within network carrier bandwidth. A BWP may comprise a plurality of sub-bands (for example, plurality of 20 MHz unlicensed channels). The transmission bandwidth of a next generation NodeB (gNB) may vary according to the sub-band specific listen-before-talk (LBT). The upper limit (e.g. N*20 MHz) may be determined by the selected numerology as well as the FFT size. For example, when using 30 kHz subcarrier spacing and 4 k FFT, the maximum channel bandwidth may be 80 MHz. When using legacy NR PDCCH structures within a BWP, dynamically varying transmission bandwidth increases complexity of PDCCH monitoring as well as configuration overhead. Therefore, there is a need for a solution, enhancing existing PDCCH structures on a BWP for NR-U, which would keep configuration overhead and monitoring complexity low.

SUMMARY

In general, example embodiments of the present disclosure provide methods, devices and computer readable storage media for downlink control channel when operating on unlicensed sub-bands.

In a first aspect, there is provided method implemented at a network device. The method comprises determining a search space configuration associated with control resources on a plurality of sub-bands which are unlicensed, the search space configuration indicating candidates for detection of downlink control information for the plurality of sub-bands; determining, from the search space configuration, positions of the candidates on the control resources within each of the plurality of sub-bands; mapping an available number of candidates to the determined positions based on a transmission bandwidth assumed by a terminal device; and transmitting downlink control information to the terminal device on the mapped candidates.

In a second aspect, there is provided method implemented at a terminal device. The method comprises receiving a search space configuration associated with control resources on a plurality of sub-bands which are unlicensed, the search space configuration indicating candidates for detection of downlink control information for the plurality of sub-bands; determining, from the search space configuration, positions of the candidates on the control resources within each of the plurality of sub-bands; determining an available number of candidates that are mapped to the determined positions based on a transmission bandwidth assumed by the terminal device; and detecting the downlink control information based on the available number of candidates.

In an third aspect, there is provided a network device. The device comprises at least one processor; and at least one memory including computer program codes. The at least one memory and the computer program codes are configured to, with the at least one processor, cause the device at least to perform the method according to the first aspect.

In a fourth aspect, there is provided a terminal device. The device comprises at least one processor; and at least one memory including computer program codes. The at least one memory and the computer program codes are configured to, with the at least one processor, cause the device at least to perform the method according to the second aspect.

In an fifth aspect, there is provided an apparatus comprising means for performing the steps of the method according to the first aspect.

In a sixth aspect, there is provided an apparatus comprising means for performing the steps of the method according to the second aspect.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIG. 3 shows a diagram 300 schematically illustrating possible bandwidth combinations for NR-U transmissions;

Throughout the drawings, the same or similar reference numerals represent the same or similar element.

DETAILED DESCRIPTION

Figure 1:
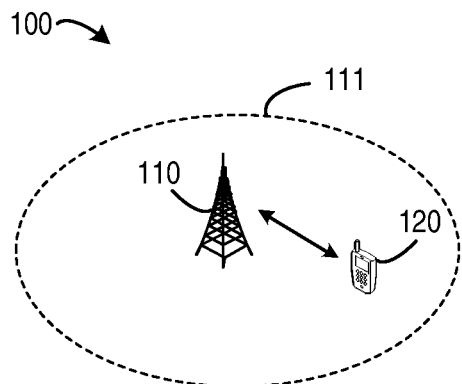
FIG. 1 shows an example communication network 100 in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay node (a.k.a. integrated access and backhaul (IAB) node), an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined resources, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 illustrates a communication network 100 in which embodiments of the present disclosure can be implemented. The communication network 100 comprises a network device 110. The network device 110 serves a terminal device 120 within its serving area (also called a cell 111).

It is to be understood that the numbers of network devices and terminal devices are shown only for the purpose of illustration without suggesting any limitation. The communication network 100 may include any suitable number of network devices and terminal devices adapted for implementing embodiments of the present disclosure. Although not shown, it would be appreciated that one or more terminal devices may be located in the cell 111 and served by the network device 110.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols and their evolution.

As mentioned above, so far, the agreement related the DL control in NR-U is very board. By contrast, PDCCH operation in NR licensed has been explained at high level in technical specification (TS) 38.300. The PDCCH can be used to schedule DL transmissions on PDSCH and UL transmissions on PUSCH, where the Downlink Control Information (DCI) on PDCCH includes:

Downlink assignments containing at least modulation and coding format, resource allocation, and hybrid-ARQ information related to DL-SCH;

Uplink scheduling grants containing at least modulation and coding format, resource allocation, and hybrid-ARQ information related to UL-SCH.

A UE monitors a set of PDCCH candidates in the configured monitoring occasions in one or more configured control resource sets (CORESETs) according to the corresponding search space configurations. A CORESET consists of a set of physical resource blocks (PRBs) with a time duration of 1 to 3 OFDM symbols. The resource units Resource Element Groups (REGs), REG bundles and Control Channel Elements (CCEs) are defined within a CORESET with each CCE consisting of one or more REG bundles. REG bundle contains at least two REGs with one PRB (physical resource block) and one OFDM symbol. Interleaved and non-interleaved CCE-to-REG mapping are supported in a CORESET. Interleaving operates with REG bundles. Control channel consists of one or more CCEs. Different code rates for the control channels are realized by aggregating different number of CCE.

Polar coding is used for PDCCH. Each resource element group carrying PDCCH carries its own DMRS. QPSK modulation is used for PDCCH.

In NR licensed, the PDCCH configuration defines CORESETs and their Search Spaces. In TS 38.331 and TS 38.213, it is further specified how to configure the CORESETs and the Search Spaces of the CORESETs.

For better understanding of the present disclosure, a brief introduction on NR-U wideband operation is now given. For NR-U wideband (larger than 20 MHz) carrier, the following scenario is assumed:
1) Operation on a 5 GHz unlicensed spectrum;
2) A large FFT size, such as 4 k FFT assumed for (licensed band) NR. The maximum number of PRBs per BWP in Rel-15 is 275. The assumption behind is that UE implementation is based on 4 k FFT (275 PRB*12 subcarriers/PRB=3300 subcarriers).
3) A large subcarrier spacing (SCS), such as 30 kHz or 60 kHz. In addition, 15 kHz SCS can be used as well.

In the present disclosure, a carrier bandwidth is the bandwidth of an NR carrier. There can be one or more BWPs in a NR carrier. A sub-band is one (or possibly multiple adjacent) channel(s) on an unlicensed carrier, and typically has a bandwidth of 20 MHz. A sub-band is aligned with the bandwidth of single LBT. UE's carrier (BWP) bandwidth may be equal or smaller than gNB's carrier bandwidth.

Figure 2:
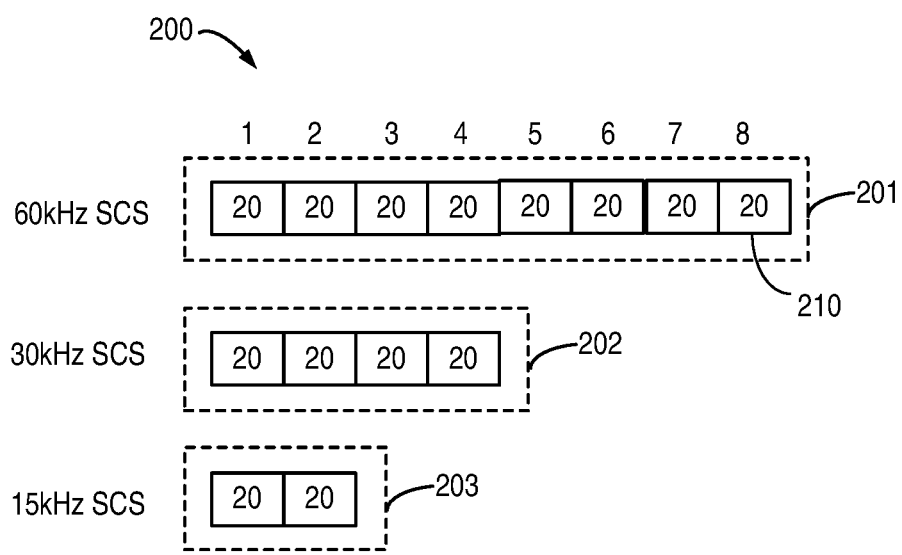
FIG. 2 shows a diagram 200 schematically illustrating possible carrier bandwidths for different subcarrier spacings.

FIG. 2 shows a diagram 200 schematically illustrating three carriers with different NR bandwidths and the number "20" in each block represents a 20 MHz sub-band. The carrier 201 with a SCS of 60 kHz has a BW of 160 MHz and comprises eight sub-bands of 20 MHz each (e.g. sub-band 210); the carrier 202 with a SCS of 30 kHz has a BW of 80 MHz and comprises four sub-bands of 20 MHz each; the carrier 203 with a SCS of 15 kHz has a BW of 40 MHz and comprises two sub-bands of 20 MHz each. As can be seen for this example that assumes a 4 k FFT, each carrier bandwidth comprises multiple 20 MHz sub-bands.

In an example, a DL scenario is considered. When operating according to NR-U scenario, a gNB should perform LBT before it can start transmitting a DL NR-U Tx burst in the cell. To meet regulatory requirements and to ensure fair coexistence with other systems, also NR unlicensed should support sub-band LBT, e.g., with 20 MHz resolution. The following agreements in this regard have been made:

Baseline for study: If absence of Wi-Fi cannot be guaranteed (e.g. by regulation) in the band (sub-7 GHz) where NR-U is operating, the NR-U operating bandwidth is an integer multiple of 20 MHz;

At least for band where absence of Wi-Fi cannot be guaranteed (e.g. by regulation), LBT can be performed in units of 20 MHz;

FFS: details on how to perform LBT for as single carrier with bandwidth greater than 20 MHz, i.e., integer multiples of 20 MHz.

FIG. 3 shows a diagram schematically illustrating possible transmission bandwidth combinations for a gNB after a sub-band-specific LBT. This example assumes a carrier bandwidth of 80 MHz, and contiguous allocation of 20 MHz sub-bands. The sub-bands are indicated by a, b, c, and d, and FIG. 3 shows how one, two, three, or all four contiguous sub-bands could be allocated for NR-U transmissions. However, also non-contiguous sets of sub-bands are not precluded.

Due to the sub-band specific LBT, prior to transmitting on the sub-bands that are available, the gNB may need to adjust the transmission bandwidth configuration, including RF settings (e.g., center frequency, analog filters) in order to meet the regulatory rules defined for the out-of-band emissions. The gNB may decide on and perform the transmission bandwidth adaptation during the LBT process, although the details of gNB BW adaptation are outside of the scope of the present disclosure. However, for the purpose of discussion, transmission bandwidth (TX BW) is herein defined as a specific term, which represents the part of the spectrum on which the gNB actually transmits after LBT. As mentioned, the TX BW may be equal to the carrier BW or the TX BW is a portion of carrier BW (one or more sub-bands) based on the outcome of LBT. It should be understood that given the above meaning of TX BW, change in TX BW (e.g., and its configuration) may change the bandwidth of transmission, the center frequency of transmission, or both the bandwidth and center frequency of transmission.

As mentioned above, there is a scenario where the transmission bandwidth for the gNB varies according to the sub-band specific LBT. The situation is more challenging for the UE, as follows:

1) Prior to the start of DL transmission, the UE knows only the wide carrier BW (i.e., all sub-bands covered by the BWP configured to a UE) on which the gNB may transmit but does not know the actual TX BW. In this case, UE may use the widest possible BW (full BWP) to detect DL transmission burst.
2) UE could read the TX BW configuration from DL control channel or determine it e.g. from burst-detection signal (such as preamble or PDCCH DMRS). The burst-detection signal may be sub-band-specific.
3) As soon as the UE knows the TX BW, the UE starts to monitor only on active sub-bands.

If the DL control structures and hashing were dependent on the outcome of LBT, the gNB and UE would need to prepare in advance for all the possible LBT outcomes, or would need to perform DL control structure mapping and hashing on fly. This increases complexity at both the UE and the gNB. On the other hand, the UE has certain PDCCH processing capability (depending on the numerology), e.g. 44 blind decodes and 56 CCEs for channel estimation per slot. It would be beneficial to exploit these capabilities maximally under varying conditions of UE receive (RX) bandwidth (due to the outcome of gNB's sub-band specific LBT).

Hence, the problem is how to configure CORESETs and search-spaces in a NR-U BWP comprising multiple 20 MHz sub-bands such that DL control structures and PDCCH hashing does not vary based on the outcome of LBT, neither between the first slot(s) or the other slots. At the same time, there is a need to reuse the existing NR licensed structures as much as possible. The term "hashing" used herein means that the determining of starting position of search-space PDCCH candidates within CCEs of a CORESET is implemented by means of a hash function. Hashing may be applied to mitigate inter-user blocking probability by randomizing the allocation of PDCCH candidates of a user within the CORESET over consecutive slots.

One previously proposed solution for the DL control for NR-U mainly focuses on the delivery of group common PDCCH (GC-PDCCH), which relates to how to configure CORESET, how to perform interleaving within the CORESET and that PDCCH candidates are confined within sub-bands in the first slot(s) to be able to receive GC-PDCCH. However, it does not address how to configure NR search-space-sets, how to perform hashing and how to determine the available PDCCH candidates in each sub-band given the TX BW.

The present disclosure focuses on the above aspects and proposes a solution with low implementation complexity, where search-space-set structure and PDCCH hashing neither vary between the first and the other slots, nor given the TX BWP (given the outcome of LBT).

According to embodiments of the present disclosure, CORESETs and search-spaces in a NR-U BWP comprising multiple sub-bands are configured such that DL control structures and PDCCH hashing do not vary based on the outcome of LBT. Furthermore, the CORESETs and search-spaces are configured such that DL control structures and PDCCH hashing do not vary between the first slot(s) or the other slots. At the same time, the proposed solution can reuse existing NR licensed structures as much as possible.

Principle and implementations of the present disclosure will be described in detail below with reference to FIG. 4, which shows a flowchart of an example method 400 for transmitting downlink control information according to some example embodiments of the present disclosure. The method 400 can be implemented at the network device 110 as shown in FIG. 1. For the purpose of discussion, the method 400 will be described with reference to FIG. 1.

At 410, the network device 110 determines a search space configuration associated with control resources on a plurality of sub-bands which are unlicensed. The search space configuration indicates candidates for detection of downlink control information for the plurality of sub-bands. For purpose of discussion, the candidates for detection of downlink control information are also referred to as "PDCCH candidates" in the context of the present disclosure. In some embodiments, each of the plurality of sub-bands may be, for example, 20 MHz or other suitable value.

According to embodiments of the present disclosure, the search space configuration may be configured in a variety of way. In some embodiments, the network device 110 may determine one or more numbers of the candidates for one or more subsets of the plurality of sub-bands by splitting the configured number of candidates for the plurality of sub-bands. The network device 110 may further determine a single number out of the one or more numbers determined for the one or more subsets. Then, based on the determined single number, the network device 110 may determine a start position of the candidates within the control resources, for example, for one or more subsets of the plurality of sub-bands. In some embodiments, the single number and the start position may be independent from the transmission bandwidth assumed by the terminal device.

The configured number of candidates may be split in several ways, for example, evenly or proportionally. In some embodiments, the configured number of candidates may be substantially evenly split for the plurality of sub-bands. Alternatively, the configured number of candidates may be split for the plurality of sub-bands based on the number of control resources allocated to each of the plurality of sub-bands.

The search space configuration may apply to a first slot(s) or a mini-slot(s) of a Channel Occupancy Time, COT. In some embodiments, gNB may acquire COT for one or multiple sub-bands based on sub-band specific LBT. Upon acquiring the COT, the DL transmission may start. The gNB may start a counter that counts the duration of the COT. The COT acquired by gNB may be used for both DL and UL transmission in the cell. Regulatory rules may define the maximum length for the COT (MCOT). The duration of the MCOT may be e.g. 4, 6, or 8 milliseconds. When COT ends, the gNB may need to perform sub-band specific LBT again to acquire the channel for the next COT. The term "TXOP, Transmission Opportunity" is also used for a similar purpose of defining a time interval when the device occupies the channel.

It is to be understood that "first slot(s)" or "mini-slot(s)" should not be considered as a limiting term. It may cover one or more monitoring occasions on one or more slots or mini-slots. The time period defined by "A first slot(s) or a mini-slot(s)" may start from the beginning of COT and it may end at the predefined slot boundary. In some alternative embodiments, the search space configuration may apply to slots of a COT, other than a first slot(s) or a mini-slot(s) of the COT. In further alternative embodiments, the search space configuration applies to all slots of a COT.

Before a downlink control information is to be transmitted from the network device 110, the network device 110 may determine, At 420, from the search space configuration, positions of the candidates on the control resources within each of the plurality of sub-bands.

At 430, the network device 110 maps an available number of candidates to the determined positions based on a transmission bandwidth assumed by a terminal device. This may depend on the way how UE determines the gNB's transmission bandwidth (e.g. based on GC-PDCCH or based on burst detection signal).

In some embodiments, the network device 110 may determine, from the plurality of sub-bands, a subset of sub-bands to be known by the terminal device. Then, the network device 110 may determine the number of available candidates for each sub-band in the subset by splitting the configured number of candidates for the subset.

The configured number of candidates may be substantially evenly split for sub-bands in the subset. Alternatively, the configured number of candidates may be split for the sub-bands in the subset based on the number of control resources allocated to the sub-bands in the subset.

In some embodiments, the total number of the configured candidates may be independent of the number of sub-bands in the subset.

In some embodiments, the mapping an available number of candidates to determined positions of candidates in a sub-band is in an ascending order of candidate indices.

At 440, the network device 110 transmits downlink control information to the terminal device on the mapped candidates.

According to embodiments of the present disclosure, to configure CORESETs and search spaces in NR-U BWP(s) comprising multiple sub-bands, the proposed scalable PDCCH design where the UE can exploit maximally it's blind detection (BD) and CCE channel estimation capabilities by dynamic partitioning of the PDCCH candidates between different sub-bands, based on the outcome of (gNB) LBT. In this way, an effective downlink control channel structure is constructed with low complexity.

In some embodiments of the present disclosure, with respect to the search space configuration, configured CCEs are indexed within sub-band and PDCCH candidate hashing is performed on CCEs within a sub-band. This guarantees that the CORESET structure remains the same irrespective of LBT outcome. Total configured number of BDs/PDCCH candidates N in a search-space-set is divided among available sub-bands according to predefined rules, for example based on (approximately) even split, or proportional split (approximately proportionally to number of configured CCEs within a sub-band).

The search-space-set configuration may be applicable only to primary sub-band or to all sub-bands or to a subset of sub-bands (based on RRC). The primary sub-band may be sub-band containing cell-defining SSB, implicitly defined by sub-band where UE performed RACH or signalled to a UE.

In some embodiments of the present disclosure, there are a variety of approaches for the search-space-set configuration & adaptation within the COT. The following illustrates two options A and B for purpose of discussion. It is to be understood that these options are merely for illustration, rather than suggesting any limitation.

Option A: Separate configurations for first slot(s) of the COT and other slots of the COT. The UE utilizes a first search-space set configuration at the beginning of the COT assuming that the UE does not yet know the actual TXBW configuration of the gNB. The second search-space-set configuration is defined for based on the determined TXBW configuration.

Option B: One search-space-set configuration covers the whole COT. This assumes that that UE is capable of determining the gNB's sub-band combination (e.g. from the wideband (WB) DMRS or a preamble).

The gNB may configure which option to use: search-space-set configuration could be applicable to monitoring occasions in first slot(s) with mini-slot monitoring (Option A), to other slots with slot-based monitoring (Option A), or to both (Option B) (2 bits in RRC).

In some embodiments, the search space set configuration may be determined for the first slot(s) of the COT. This may apply to Option A only. In these embodiments, it is assumed that the total budget is N candidates, and the N candidates may be shared between all sub-bands (& corresponding search spaces). The N candidates may be split in a variety of ways. For example, the N candidates may be approximately even split. Alternatively, they may be split proportionally to number of configured CCEs within a sub-band.

Alternatively, in some embodiments, the search space set configuration may be determined for other slots of the COT (Option A only) and for Option B. Assuming that UE knows the number of sub-bands (i.e. the outcome of gNB's LBT or TX BW). N candidates are shared between determined sub-bands. The number of candidates in search-space of a sub-band is based on the number of sub-bands. The starting point is that N (total budget) does not vary according to LBT. On the other hand, if only one or two sub-bands are available, then the UE might survive with less number of BDs, and $N_i$ could be configured separately for i=1, 2, 3 and 4 available sub-bands. $N_i$ BDs are shared (approximately evenly/proportionally to number of CCEs) between search-spaces of i available sub-bands within TX BW.

NR hashing function (below) is based on $M_{p,s,max}^{(L)}$ which is in the preferred embodiment defined as maximum number of candidates per given sub-band across configured values of $N_i$. The number of BDs per search space varies according to LBT (the number of sub-bands), some pre-calculated candidates in a sub-band may be dropped, but the order of candidates (candidate positions) within a sub-band does not vary according to LBT, UE and gNB does not need to re-iterate hashing (i.e. determination of PDCCH candidate starting positions) given the outcome of LBT. This allows to calculate the CCE positions of PDCCH candidates in advance. The available candidates (those which are not dropped) may be mapped in ascending order to the pre-hashed PDCCH candidate positions.

$$L \cdot \left\{ \left( Y_{p,n^X,f} + \left\lfloor \frac{m_{s,n_{CI}} \cdot N_{CCE,p}}{L \cdot M_{p,s,max}^{(L)}} \right\rfloor + n_{CI} \right) \bmod \left\lfloor \frac{N_{CCE,p}}{L} \right\rfloor \right\} + i \qquad (1)$$

In the above hashing function (1), L represents an aggregation level (AL) of PDCCH candidate;
$Y_p$ represents UE-specific randomization in coreset p;
$M_{p,s,max}^{(L)}$ represents the number of candidates in search-space s in coreset p, maximum number of candidates per given sub-band across configured values of $N_i$;
$m_s$ represents index of candidate 0 ... $M_{p,s,max}^{(L)}$ in search-space s;

$N_{CCE,p}$ represents number of CCEs in a CORESET;
$n_{CI}$ represents an offset of carrier with carrier index;
i represents CCEs of PDCCH candidate i=0 . . . (L−1).

More details will be discussed now with reference to embodiments of FIGS. 5 and 6. In some embodiments, CORESET #0 (if configured by MIB or SIB1) is located within 20 MHz sub-band where UE performs initial access.

Dedicated CORESET is configured across NR-U BWP using legacy 45 bit bitmap, however 6 PRB grid is aligned to the first PRBs of the sub-bands instead of point A as in licensed NR (see FIG. 3). The benefit of this approach is that it allows optimizing the CORESET location w.r.t. guard band needed at the sub-band borders. In addition to that interleaving (if configured) is only on REG-bundles within sub-band, it is possible to configure multiple parallel CORE-SETs each covering one or multiple sub-bands.

Figure 5:
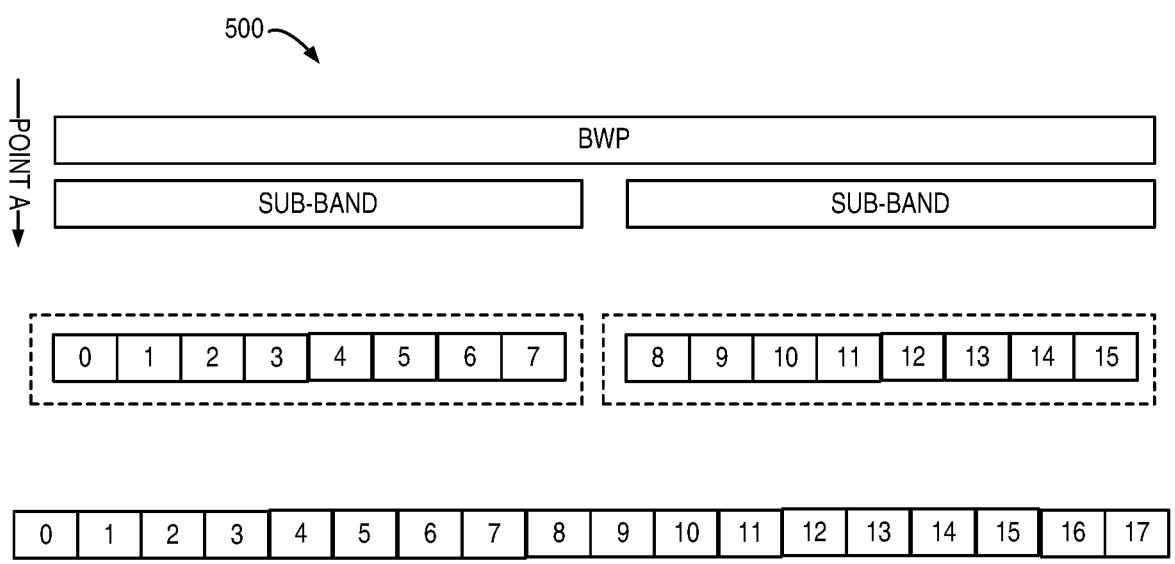
FIG. 5 shows a diagram 500 schematically illustrating a Control Resource Set (CORESET) configuration according to some example embodiments of the present disclosure.

FIG. 5 shows a diagram 500 schematically illustrating CORESET configuration according to some example embodiments of the present disclosure. The existing configuration frequencyDomainResources IE (45 bits) is reused, however, the bits are interpreted differently. Instead of uniform 6 PRB grid starting at Point A, as in licensed NR, the grid is non-uniform and present only within PRBs of a sub-band according to embodiments of the present disclosure. As illustrated in FIG. 5, legacy approach results into sub-band #0 comprising at most 7 6-PRB blocks. Proposed solution enable configuration of at most 8 6PRB blocks. For this example, it could be possible to adjust position of point A, but such might be infeasible with BWP comprising 4 sub-bands (this could be doable e.g. with two parallel CORESETs both covering two sub-bands).

Following the example in FIG. 5, gNB may configure the CORESET with the following properties.

frequencyDomainResources=
[11111111|01111110|00000 . . . ] duration=[1]

The configuration provides 8CCE search-space in every monitoring occasion in sub-band #0 and 6CCE in every monitoring occasion of sub-band #1.

Figure 6:
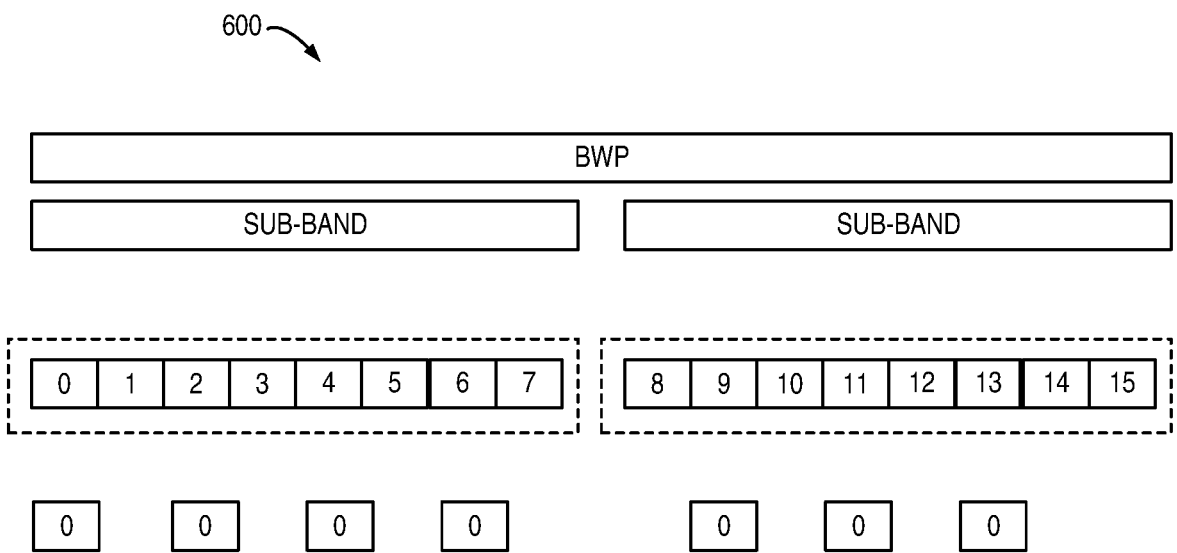
FIG. 6 shows a diagram 600 schematically illustrating a hashing function according to some example embodiments of the present disclosure.

FIG. 6 shows a diagram 600 schematically illustrating a hashing function according to some example embodiments of the present disclosure. In the embodiments, assuming that the search-space-set is configured e.g. with $N_2=7$ and $N_1=3$ for AL1, and assuming proportional split with 8 CCEs in Sub-band #0 and 6 CCEs in Sub-band #1, the number of $N_j$ of configured candidates would be split as shown in Table 1 as follows. For simplicity only AL1 is assumed in this example, but procedure in this example can apply to any AL configured for a search-space-set.

TABLE 1

Number of candidates as outcome of LBT

|  | Sub-band#0 | Sub-band#1 |
| --- | --- | --- |
| Sub-band#0 active in COT | 3 | 0 |
| Sub-band #1 active in COT | 0 | 3 |
| Both active in COT | 4 | 3 |
| Maximum $M_{p,s,max}^{(L)}$ for hashing | 4 | 3 |

Therefore, based on the preferred embodiment $M_{p,s,max,0}^{(L)}=4$ for Sub-band #0 and $M_{p,s,max,1}^{(L)}=3$ for sub-band #1 according to proportional split. The hashing, assuming Y=0 for simplicity, is illustrated in FIG. 6. In case, only the sub-band #0 is active, the PDCCH candidate #3 of sub-band #0 is dropped (not monitored/mapped) by the UE.

On interaction of Tx BW dependent PDCCH candidate split (BD compression) with NR licensed overbooking of BD/CCE limits As mentioned above, CCE and BD limits are imposed in R15 due to limited PDCCH monitoring capability at the UE. Let us denote by "BD compression" the proposed algorithm of splitting the configured candidates between sub-bands, and by "BD/CCE dropping" the R15 overbooking algorithm. BD/CCE dropping algorithm drops full search-space-sets based on search-space-set configured index, if UE capabilities in terms of BD and CCE are exceeded.

Now assume the following configuration example (solution with BD compression):

SS #0 in symbol #0 of the slot would be N_4=8 and N_1=4

SS #1 in symbol #1 of the slot would be N_4=8 and N_1=4

BD limit be set to 8

If 4 sub-bands are active then only SS #0 is active, candidates are spread over sub-bands. SS #1 is dropped due to the BD limit. If only 1 sub-band is active then both SS #0 and SS #1 are active.

On the other hand, assuming that search-space-sets are allowed to be configured only per sub-band (i.e. solution without BD compression) gNB would need to configure multiple small search-space set per sub-band, and having 4 active sub-bands many search-space-sets would be dropped due to BD/CCE dropping algorithm, resulting in some cases to dropping of monitoring in entire sub-bands. Furthermore, the number of search-space-sets is limited to 10, plus configuration of large number of search-space-sets increases significantly the RRC overhead, which is already high in R15 NR.

Thus, the proposed solution needs to precede the BD/CCE dropping algorithm defined in R15.

According to embodiments of the present disclosure, quite a few of advantages can be achieved. For example, proposed CORESET configuration (compared to legacy NR licensed configuration) enables to always fit CORESET of size 48 RB to all 20 MHz sub-bands of 30 kHz SCS. Furthermore, proposed CORESET configuration enable fixed CORESET structure irrespective of LBT outcome. Still further, the splitting rules together with modified hashing definition enable UE and gNB to hash only once, based on configuration, i.e. hashing is independent of LBT outcome. This will reduce the complexity related to PDCCH monitoring (for both UE and gNB). In addition, the proposed solution supports both interleaved and non-interleaved CCE-to-REG mapping options defined in NR Rel-15.

Figure 7:
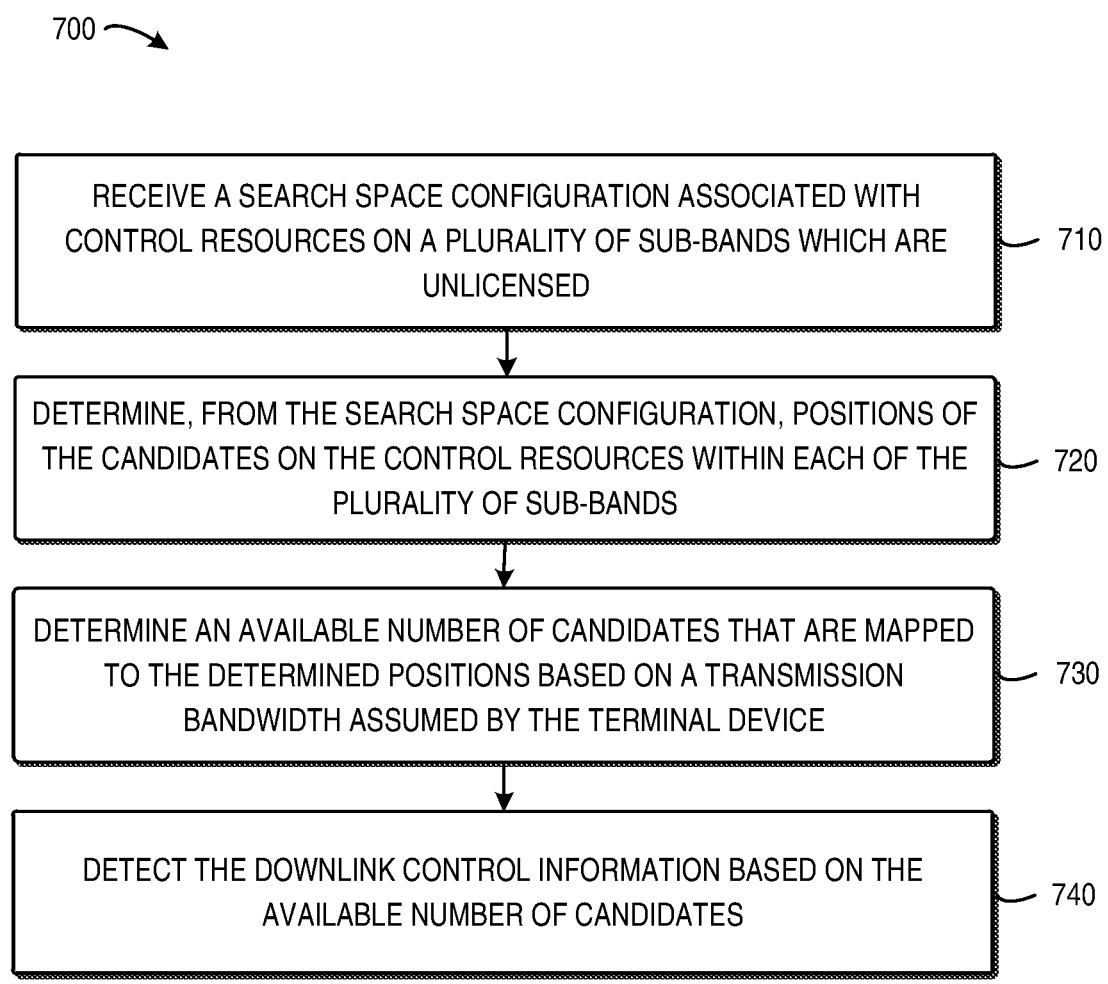
FIG. 7 shows a flowchart of an example method 700 for receiving downlink control information according to some example embodiments of the present disclosure.

FIG. 7 shows a flowchart of an example method 700 for receiving downlink control information according to some example embodiments of the present disclosure. The method 700 can be implemented at the terminal device 120 as shown in FIG. 1. For the purpose of discussion, the method 700 will be described with reference to FIG. 1.

At 710, the terminal device 120 receives a search space configuration associated with control resources on a plurality of sub-bands which are unlicensed. The search space configuration indicates candidates for detection of downlink control information for the plurality of sub-bands.

At 720, the terminal device 120 determines, from the search space configuration, positions of the candidates on the control resources within each of the plurality of sub-bands.

In some embodiments, the terminal device determines a start position of the candidates within the control resources based on a single number based on the search space configuration. The single number may be determined out of the one or more numbers of the candidates determined for one or more subsets of the plurality of sub-bands. The one or more numbers of the candidates may be determined for the one or more subsets splitting the configured number of candidates for the plurality of sub-bands.

In some embodiments, the single number and the start position may be independent from the transmission bandwidth assumed by the terminal device.

In some embodiments, the configured number of candidates may be substantially evenly split for the plurality of sub-bands. Alternatively, the configured number of candidates may be split for the plurality of sub-bands based on the number of control resources allocated to each of the plurality of sub-bands.

In some embodiments, the search space configuration may apply to a first slot(s) or a mini-slot(s) of a COT. In some alternative embodiments, the search space configuration applies to slots of a COT, other than a first slot(s) or a mini-slot(s) of the COT. In further alternative embodiments, the search space configuration applies to all slots of a COT.

At 730, the terminal device 120 determines an available number of candidates that are mapped to the determined positions based on a transmission bandwidth assumed by the terminal device.

In some embodiments, the terminal device 120 may determine a subset of sub-bands from the plurality of sub-bands. Then, the terminal device 120 may determine the number of available candidates for each sub-band in the subset by splitting the configured number of candidates for the subset.

The configured number of candidates may be substantially evenly split for sub-bands in the subset. Alternatively, the configured number of candidates may be split for the sub-bands in the subset based on the number of control resources allocated to the sub-bands in the subset.

In some embodiments, the total number of the configured candidates is independent of the number of sub-bands in the subset.

In some embodiments, such mapping is performed in an ascending order of candidate indices.

At 740, the terminal device 120 detects the downlink control information based on the available number of candidates.

According to embodiments of the present disclosure, CORESETs and search-spaces in a NR-U BWP comprising multiple sub-bands are configured such that DL control structures and PDCCH hashing do not vary based on the outcome of LBT. As such, the search-space-set structure and the PDCCH hashing which are independent of the outcome of LBT can be achieved with low complexity.

In some embodiments, the terminal device 120 may receive at least one search-space-set configuration for at least one CORESET spanning multiple sub-bands (20 MHz sub-bands). The configuration comprises number of PDCCH candidates per each aggregation level and per at least maximum number of sub-bands within a BWP, i.e. N. For each search-space-set and the corresponding CORESET. The configured search-space-set may be applicable to primary sub-band, all-sub bands or a subset of sub-bands.

The terminal device 120 may determine CCEs of a CORESET within each sub-band where CORESET has been configured.

The terminal device 120 may determine the maximum number of PDCCH candidates for hashing $M_{max}$ to be the one configured for maximum number of sub-bands N.

In some embodiments, the terminal device 120 may receive additional configuration of number of PDCCH candidates for the search-space-set, in addition to at least maximum number of sub-bands, also for the case where subset of sub-bands is active $N_i$. The maximum number of PDCCH candidates for hashing $M_{max}$ in a sub-band should be determined according to the maximum number of candidates across all possible sub-band combinations $N_i$.

In some embodiments, the terminal device 120 may perform hashing for each sub-band based on determined maximum number of PDCCH candidates for hashing $M_{max}$ in the sub-band.

Based on determined sub-band combination (consequence of LBT outcome at the gNB), the terminal device 120 may determine the number of candidates per sub-band by splitting the number of configured PDCCH candidates between the active sub-bands of search-space-set according to a rule. In some embodiments, the rule may be approximately even split. Alternatively, the rule may be split approximately proportional to number of CCE within sub-bands.

In some embodiments, the terminal device 120 may map determined number of candidates per sub-band to already pre-hashed search-space.

In some example embodiments, an apparatus capable of performing the method 400 (for example, the network device 110) may comprise means for performing the respective steps of the method 400. The means may be implemented in any suitable form. For example, the means may be implemented in a circuitry or software module.

In some example embodiments, the apparatus comprises: means for determining a search space configuration associated with control resources on a plurality of sub-bands which are unlicensed, the search space configuration indicating candidates for detection of downlink control information for the plurality of sub-bands; means for determining, from the search space configuration, positions of the candidates on the control resources within each of the plurality of sub-bands; means for mapping an available number of candidates to the determined positions based on a transmission bandwidth assumed by a terminal device; and means for transmitting downlink control information to the terminal device on the mapped candidates.

In some example embodiments, the means for determining the search space configuration comprises: means for determining one or more numbers of the candidates for one or more subsets of the plurality of sub-bands by splitting the configured number of candidates for the plurality of sub-bands; means for determining a single number out of the one or more numbers determined for the one or more subsets; and means for determining a start position of the candidates within the control resources based on the determined single number.

In some example embodiments, the single number and the start position may be independent from the transmission bandwidth assumed by the terminal device.

In some example embodiments, the configured number of candidates are substantially evenly split for the plurality of sub-bands; or the configured number of candidates are split for the plurality of sub-bands based on the number of control resources allocated to each of the plurality of sub-bands.

In some example embodiments, the search space configuration applies to a first slot(s) or a mini-slot(s) of a Channel Occupancy Time, COT.

In some example embodiments, the search space configuration applies to slots of a Channel Occupancy Time, COT, other than a first slot(s) or a mini-slot(s) of the COT.

In some example embodiments, the search space configuration applies to all slots of a Channel Occupancy Time, COT.

In some example embodiments, the means for mapping the available number of candidates to the determined positions comprises: means for determining, from the plurality of sub-bands, a subset of sub-bands to be known by the terminal device; and means for determining the number of available candidates for each sub-band in the subset by splitting the configured number of candidates for the subset.

In some example embodiments, the configured number of candidates are substantially evenly split for sub-bands in the subset; or the configured number of candidates are split for the sub-bands in the subset based on the number of control resources allocated to the sub-bands in the subset.

In some example embodiments, the total number of the configured candidates is independent of the number of sub-bands in the subset.

In some example embodiments, the mapping an available number of candidates to determined positions of candidates in a sub-band is in an ascending order of candidate indices.

In some example embodiments, an apparatus capable of performing the method 700 (for example, the terminal device 120) may comprise means for performing the respective steps of the method 700. The means may be implemented in any suitable form. For example, the means may be implemented in a circuitry or software module.

In some example embodiments, the apparatus comprises: means for receiving a search space configuration associated with control resources on a plurality of sub-bands which are unlicensed, the search space configuration indicating candidates for detection of downlink control information for the plurality of sub-bands; means for determining, from the search space configuration, positions of the candidates on the control resources within each of the plurality of sub-bands; means for determining an available number of candidates that are mapped to the determined positions based on a transmission bandwidth assumed by the terminal device; and means for detecting the downlink control information based on the available number of candidates.

In some example embodiments, the terminal device determines a start position of the candidates within the control resources based on a single number based on the search space configuration, the single number is determined out of the one or more numbers of the candidates determined for one or more subsets of the plurality of sub-bands, and the one or more numbers of the candidates are determined for the one or more subsets splitting the configured number of candidates for the plurality of sub-bands.

In some example embodiments, the single number and the start position may be independent from the transmission bandwidth assumed by the terminal device.

In some example embodiments, the configured number of candidates are substantially evenly split for the plurality of sub-bands; or the configured number of candidates are split for the plurality of sub-bands based on the number of control resources allocated to each of the plurality of sub-bands.

In some example embodiments, the search space configuration applies to a first slot(s) or a mini-slot(s) of a Channel Occupancy Time, COT.

In some example embodiments, the search space configuration applies to slots of a Channel Occupancy Time, COT, other than a first slot(s) or a mini-slot(s) of the COT.

In some example embodiments, the search space configuration applies to all slots of a Channel Occupancy Time, COT.

In some example embodiments, the means for determining the available number of candidates that are mapped to the determined positions comprises: means for determining a subset of sub-bands from the plurality of sub-bands; and means for determining the number of available candidates for each sub-band in the subset by splitting the configured number of candidates for the subset.

In some example embodiments, the configured number of candidates are substantially evenly split for sub-bands in the subset; or the configured number of candidates are split for the sub-bands in the subset based on the number of control resources allocated to the sub-bands in the subset.

In some example embodiments, the total number of the configured candidates is independent of the number of sub-bands in the subset.

In some example embodiments, the mapping an available number of candidates to determined positions of candidates in a sub-band is in an ascending order of candidate indices.

Figure 8:
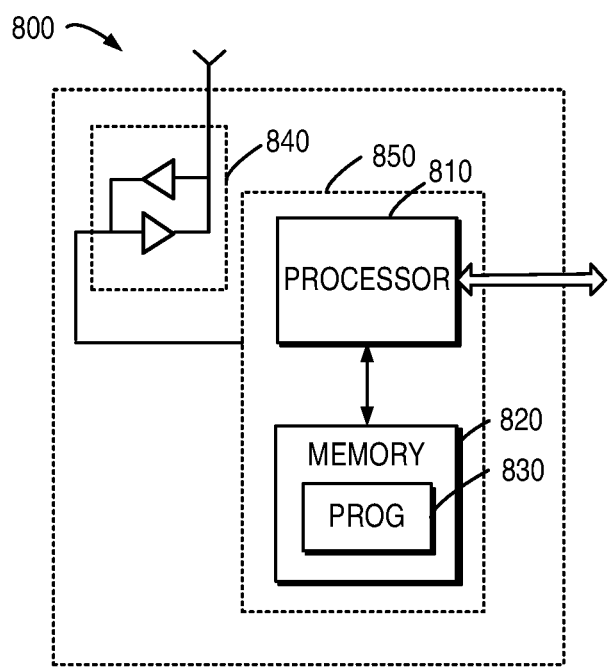
FIG. 8 is a simplified block diagram of a device 800 that is suitable for implementing example embodiments of the present disclosure.

FIG. 8 is a simplified block diagram of a device 800 that is suitable for implementing example embodiments of the present disclosure. The device 800 can be considered as a further example implementation of a terminal device 120 as shown in FIG. 1. Accordingly, the device 800 can be implemented at or as at least a part of the network device 110.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

Figure 4:
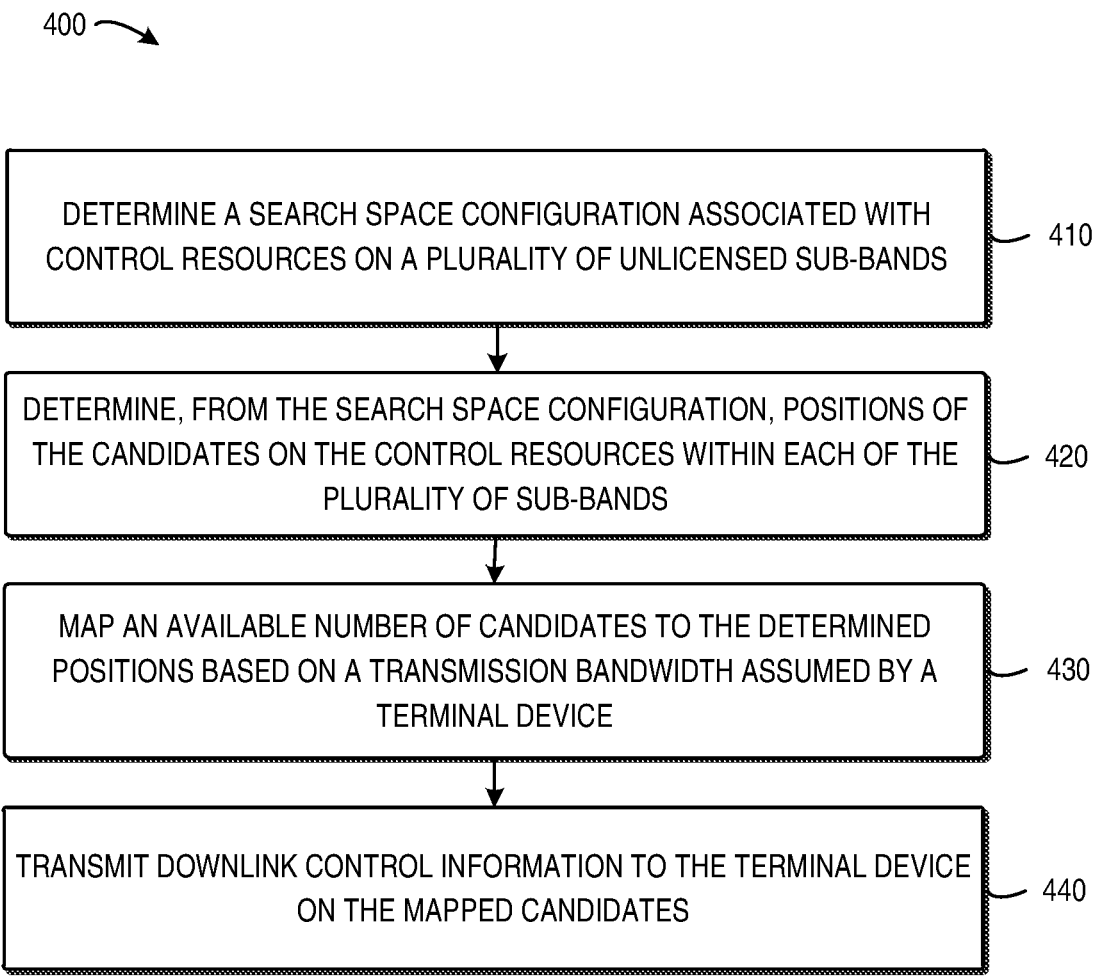
FIG. 4 shows a flowchart of an example method 400 for transmitting downlink control information according to some example embodiments of the present disclosure.

The program 830 is assumed to include program instructions that, when executed by the associated processor 810, enable the device 800 to operate in accordance with the example embodiments of the present disclosure, as discussed herein with reference to FIGS. 2 to 4. The example embodiments herein may be implemented by computer software executable by the processor 810 of the device 800, or by hardware, or by a combination of software and hardware. The processor 810 may be configured to implement various example embodiments of the present disclosure. Furthermore, a combination of the processor 810 and memory 810 may form processing means 850 adapted to implement various example embodiments of the present disclosure.

The memory 810 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 810 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 4 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:
1. A method comprising:
   determining at a network device a search space configuration associated with control resources on a plurality of sub-bands which are unlicensed, the search space configuration indicating candidates for detection of downlink control information for the plurality of sub-bands;
   determining at the network device, from the search space configuration, positions of the candidates on the control resources within each of the plurality of sub-bands;
   mapping at the network device an available number of candidates to the determined positions based on a transmission bandwidth assumed by a terminal device; and
   transmitting from the network device downlink control information to the terminal device on the mapped candidates.

2. The method of claim 1, wherein determining the search space configuration comprises:
   determining one or more numbers of the candidates for one or more subsets of the plurality of sub-bands by splitting the configured number of candidates for the plurality of sub-bands;
   determining a single number out of the one or more numbers determined for the one or more subsets; and
   determining a start position of the candidates within the control resources based on the determined single number.

3. The method of claim 2, wherein the configured number of candidates are substantially evenly split for the plurality of sub-bands; or
   the configured number of candidates are split for the plurality of sub-bands based on the number of control resources allocated to each of the plurality of sub-bands.

4. The method of claim 2, wherein the single number and the start position are independent from the transmission bandwidth assumed by the terminal device.

5. The method of claim 1, wherein mapping the available number of candidates to the determined positions comprises:
    determining, from the plurality of sub-bands, a subset of sub-bands to be known by the terminal device; and
    determining the number of available candidates for each sub-band in the subset by splitting the configured number of candidates for the subset.

6. The method of claim 5, wherein the configured number of candidates are substantially evenly split for sub-bands in the subset; or
    the configured number of candidates are split for the sub-bands in the subset based on the number of control resources allocated to the sub-bands in the subset.

7. The method of claim 5, wherein the total number of the configured candidates is independent of the number of sub-bands in the subset.

8. The method of claim 5, wherein the mapping an available number of candidates to determined positions of candidates in a sub-band is in an ascending order of candidate indices.

9. A method comprising:
    receiving at a terminal device a search space configuration associated with control resources on a plurality of sub-bands which are unlicensed, the search space configuration indicating candidates for detection of downlink control information for the plurality of sub-bands;
    determining at the terminal device, from the search space configuration, positions of the candidates on the control resources within each of the plurality of sub-bands;
    determining at the terminal device an available number of candidates that are mapped to the determined positions based on an assumed transmission bandwidth; and
    detecting at the terminal device the downlink control information based on the available number of candidates.

10. The method of claim 9, further comprising determining at the terminal device a start position of the candidates within the control resources based on a single number based on the search space configuration, the single number is determined out of the one or more numbers of the candidates determined for one or more subsets of the plurality of sub-bands, and the one or more numbers of the candidates are determined for the one or more subsets splitting the configured number of candidates for the plurality of sub-bands.

11. The method of claim 10, wherein the configured number of candidates are substantially evenly split for the plurality of sub-bands; or
    the configured number of candidates are split for the plurality of sub-bands based on the number of control resources allocated to each of the plurality of sub-bands.

12. The method of claim 10, wherein the single number and the start position are independent from the assumed transmission bandwidth.

13. The method of claim 9, wherein determining the available number of candidates that are mapped to the determined positions comprises:
    determining a subset of sub-bands from the plurality of sub-bands; and
    determining the number of available candidates for each sub-band in the subset by splitting the configured number of candidates for the subset.

14. The method of claim 13, wherein the configured number of candidates are substantially evenly split for sub-bands in the subset; or
    the configured number of candidates are split for the sub-bands in the subset based on the number of control resources allocated to the sub-bands in the subset.

15. The method of claim 13, wherein the total number of the configured candidates is independent of the number of sub-bands in the subset.

16. The method of claim 13, wherein the mapping an available number of candidates to determined positions of candidates in a sub-band is in an ascending order of candidate indices.

17. An apparatus comprising:
    at least one processor; and
    at least one memory including computer program code;
    the at least one memory and the computer program code configured to, with the at least one processor, cause the apparatus to:
    determine a search space configuration associated with control resources on a plurality of sub-bands which are unlicensed, the search space configuration indicating candidates for detection of downlink control information for the plurality of sub-bands;
    determine, from the search space configuration, positions of the candidates on the control resources within each of the plurality of sub-bands;
    map an available number of candidates to the determined positions based on a transmission bandwidth assumed by a terminal device; and
    transmit downlink control information to the terminal device on the mapped candidates.

18. An apparatus comprising:
    at least one processor; and
    at least one memory including computer program code;
    the at least one memory and the computer program code configured to, with the at least one processor, cause the apparatus to:
    receive a search space configuration associated with control resources on a plurality of sub-bands which are unlicensed, the search space configuration indicating candidates for detection of downlink control information for the plurality of sub-bands;
    determine, from the search space configuration, positions of the candidates on the control resources within each of the plurality of sub-bands;
    determine an available number of candidates that are mapped to the determined positions based on an assumed transmission bandwidth; and
    detect the downlink control information based on the available number of candidates.

19. A non-transitory computer readable medium comprising program instructions for causing an apparatus to perform at least the method claim 1.

20. A non-transitory computer readable medium comprising program instructions for causing an apparatus to perform at least the method claim 9.

* * * * *